3,536,701
PROCESS OF PREPARING α-AMINO-ω-LACTAMS
Johan P. H. von den Hoff and Winfried J. W. Vermijs, Geleen, Netherlands, assignors to Stamicarbon N.V., Heerlen, Netherlands
No Drawing. Filed Dec. 15, 1967, Ser. No. 690,750
Claims priority, application Netherlands, Dec. 16, 1966, 6617681
Int. Cl. C07d 41/06
U.S. Cl. 260—239.3                              3 Claims

ABSTRACT OF THE DISCLOSURE

A process for the hydrogenation of α-nitro-ω-lactams to α-amino-ω-lactams using a chromium-alloyed Raney nickel catalyst is described.

---

The present invention relates to a process of preparing α-amino-ω-lactams by catalytic hydrogenation of water-soluble salts of the aci-form of the corresponding α-nitro-ω-lactams.

In the ordinary practice of this process, which is known from the British patent specification 916,771, a large number of hydrogenation catalysts can be used. Which catalyst is best suited for the process in a given case depends, for instance, on the conversion efficiency desired and on the rate of catalyst consumption. If the catalyst used is Raney nickel, excellent conversion efficiencies can be obtained, as may be seen from the examples in the above-mentioned British patent specification. However, it has also been found that Raney nickel catalyst consumption is rather high, as a considerable portion of this catalyst dissolves in the reaction medium. Consequently, the use of Raney nickel for the subject hydrogenation process is very costly.

It has now been found according to the present invention that in the hydrogenation of water-soluble salts of aci-α-nitro-ω-lactams the dissolution of the catalyst in the reaction medium; and its consumption in the reaction, can be considerably reduced if the Raney catalyst used principally consists of nickel alloyed with at least 0.1% by weight of chromium. At the same time, the very high conversion efficiency of ordinary Raney nickel catalysts is maintained.

This very favorable behavior of this catalyst used in the process according to the invention is unexpected and particularly surprising since in standard tests (hydrogenation under standard conditions of such compounds as e.g., phenol) this catalyst does not show any noticeable difference from a Raney catalyst consisting exclusively of nickel.

In addition to the lower degree of solubility and consumption of the catalyst in the reaction medium, the process according to the invention has the further important advantage that the hydrogenation rate is also considerably improved.

By preference the catalyst contains from about 0.5–5%, by weight of chromium with respect to the nickel, according to this invention. The preparation of this catalyst can be done in various known ways. Particularly good results are obtained for the process of the present invention with a catalyst prepared by dissolving into an alkaline solution, by known techniques, the aluminum of an aluminum-nickel-chromium alloy containing from about 55–65% by weight of aluminum. The alkaline solution used for this purpose may be composed of 30% by weight of caustic soda and 70% by weight of water.

An example of a catalyst of this kind is the Raney nickel-chromium catalyst indicated as No. 24 in the Technical Bulletin L–500-464 of the "Raney Catalyst Division" of W. R. Grace and Co. (Chattanooga, Tennessee, U.S.A.). This catalyst is prepared from an alloy containing 57% by weight of aluminum, 42% by weight of nickel, and 1% by weight of chromium.

The process according to the invention for the preparation of α-amino-ε-caprolactam will be further understood by reference to the following example without however restricting the invention to this specific mode of operation.

EXAMPLE OF THE PRESENT INVENTION 7.5 kg. of Raney nickel-chromium catalyst No. 24 of the "Raney Catalyst Division" of W. R. Grace and Co. and 150 litres of water were introduced into a 600-litre autoclave equipped with a powerful turbine stirrer. A mixture of hydrogen and nitrogen (85% by vol. of hydrogen) gas was then passed through the catalyst suspension in the autoclave, and the pressure in the autoclave brought to 20 atm. gauge by means of a blowdown valve. At this pressure, the temperature of the catalyst suspension was brought to about 85° C. with stirring. Thereafter, 90 kg. of α-nitro-ε-caprolactam dissolved in 220 kg. of 5%-by-weight ammonia water was pumped into the autoclave, with stirring, in a period of 0.5 h. After the whole amount of nitro-caprolactam had been added, it appeared that stirring under hydrogen pressure had to be continued for 5 more minutes, in order to effect complete hydrogenation of α-amino-ε-caprolactam.

The catalyst was thereafter separated from the reaction liquid by allowing it to settle while maintaining the hydrogen pressure. The liquid reaction medium was then removed from the autoclave except for 150 litres of liquid which were allowed to remain in it, along with the settled catalyst.

Subsequently, several more 90 kg. α-nitro-ε-caprolactam charges were hydrogenated in the autoclave under the same conditions, in each case an amount of 150 litres of liquid reaction medium being left in the autoclave in addition to the settled catalyst. In this procedure the hydrogenation rate was maintained at about the same value by merely adding 1 kg. of fresh catalyst after every 10 charges. The catalyst consumption thus involved amounts to only about 1 g. per kg. of α-nitro-ε-caprolactam.

COMPARATIVE EXAMPLE

Into the same autoclave as mentioned in the above example there were introduced 7.5 kg. of commercially obtainable Raney nickel catalyst (prepared from an aluminum-nickel alloy with 50% by weight of aluminium and 50% by weight of nickel) and 150 litres of water.

Under the same conditions as mentioned in the above example, an identical charge, viz 90 kg. of α-nitro-ε-caprolactam, was pumped into the autoclave in half an hour's time. After the addition of the nitro-lactam, it appeared that stirring under hydrogen pressure had to be continued for 10 more minutes to effect complete hydrogenation.

After completion, 30% of the catalyst was found to have dissolved in the reaction medium. The remainder of the catalyst could be used once again for the complete hydrogenation of a following 90 kg. α-nitro-ε-caprolactam charge, which was done, this time, however, by pumping the nitrolactam into the autoclave in one hour and thereafter continuing stirring under hydrogen pressure for 20 more minutes. In this case the catalyst consumption amounts to about 40 g. per kg. of α-nitro-ε-caprolactam.

STANDARD TESTING OF CATALYSTS 100 ml. of a mixture consisting of 70% by weight of phenol and 30% by weight of cyclohexanol is hydrogenated with pure hydrogen at a constant, small superatmospheric pressure, and with the aid of 250 mg. of catalyst, at a temperature of 50° C.

The amount of hydrogen (in ml., reduced to 0° C. and 760 mm. mercury) taken up by the catalyst in the hydrogenation process per hour and per gramme of nickel (or nickel-chromium) is a measure of the activity of the catalyst concerned.

For the catalyst mentioned in the first example the activity measured in this way amounted to 450–550 ml. of hydrogen, and for the catalyst mentioned in the comparative example it was, likewise, 450–550 ml. of hydrogen.

The practice of the process of this invention may otherwise be conducted at the normal temperatures, pressures, concentrations and like reaction conditions as have been used in the past for the conversion of $\alpha$-nitro-$\omega$-lactams to $\alpha$-amino-$\omega$-lactams, as illustrated in, e.g. British Pat. 916,771. Various $\alpha$-amino-$\omega$-lactams may also be employed, as desired. These features are not critical or unique to the present invention which essentially resides in the discovery of the unpredictable advantages of the chrome-alloyed Raney nickel catalyst described above.

Accordingly, this invention is limited solely by the spirit and scope of the following claims.

What is claimed is:

1. In the process for the preparation of $\alpha$-amino-$\omega$-lactams by catalytic hydrogenation of water-soluble salts of the aci-form of the corresponding $\alpha$-nitro-$\omega$-lactams in the presence of a Raney nickel catalyst, the improvement consisting essentially in that the nickel in said Raney nickel catalyst is alloyed with at least 0.1% by weight of chromium.

2. Process according to claim 1, characterized in that the catalyst contains 0.5–5% by weight of chromium, calculated with respect to the nickel.

3. Process according to claim 1, characterized in that the catalyst has been prepared from an aluminium-nickel-chromium alloy containing 55–65% by weight of aluminium.

References Cited

UNITED STATES PATENTS

| | | | |
|---|---|---|---|
| 2,564,331 | 8/1951 | Hawley | 252—472 |
| 3,048,580 | 8/1962 | Ottenheym et al. | 260—239.3 |
| 3,052,620 | 9/1962 | Ottenheym et al. | 260—239.3 |
| 3,437,656 | 4/1969 | Vermijs et al. | 260—239.3 |

OTHER REFERENCES

Noller: "Chemistry of Organic Compounds," 2nd edition, pages 260–261, (Saunders) (1957).

Paul: Bull. Soc. Chim., France, pages 208–211 (1946).

HENRY R. JILES, Primary Examiner

R. T. BOND, Assistant Examiner